US007577583B2

(12) United States Patent
Litke et al.

(10) Patent No.: US 7,577,583 B2
(45) Date of Patent: Aug. 18, 2009

(54) COMPUTERIZED ARTICLE CUSTOMIZATION SYSTEM AND METHOD FOR USE THEREOF

(75) Inventors: Kenneth S. Litke, Marion, MA (US); Michael Redwood, Somerton (GB); Saunders N. Whittlesey, Deerfield, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/924,463

(22) Filed: Aug. 9, 2001

(65) Prior Publication Data

US 2003/0033207 A1 Feb. 13, 2003

(51) Int. Cl.
*G06Q 30/00* (2006.01)
(52) U.S. Cl. .................................................. 705/26
(58) Field of Classification Search .................. 705/26, 705/27
See application file for complete search history.

(56) References Cited

U.S. PATENT DOCUMENTS

| 586,150 | A | | 7/1897 | Wilcox | |
|---|---|---|---|---|---|
| 2,095,095 | A | * | 10/1937 | Howard | 36/59 R |
| RE21,173 | E | * | 8/1939 | Fuller | 36/59 R |
| 3,218,734 | A | * | 11/1965 | O'Brien | 36/133 |
| 3,311,999 | A | * | 4/1967 | Macneill | 36/127 |
| 4,137,634 | A | | 2/1979 | Klamar | 33/12 |
| 4,173,074 | A | | 11/1979 | Newman et al. | 33/2 R |
| 4,190,959 | A | | 3/1980 | Darvin | 33/3 |
| 4,270,285 | A | * | 6/1981 | Antonious | 36/50.1 |
| 4,330,950 | A | * | 5/1982 | Reddien | 36/127 |
| 4,539,585 | A | * | 9/1985 | Spackova et al. | 382/100 |
| 4,546,434 | A | | 10/1985 | Gioello | 364/300 |
| 4,552,151 | A | | 11/1985 | Bolomey et al. | 128/653 |
| 4,558,420 | A | | 12/1985 | Gerber | 364/476 |
| 4,561,127 | A | | 12/1985 | Gerber | 2/243 R |
| 4,586,150 | A | | 4/1986 | Budziak et al. | 364/562 |
| 4,598,376 | A | | 7/1986 | Burton et al. | 364/470 |
| 4,745,290 | A | * | 5/1988 | Frankel et al. | 250/559.17 |

(Continued)

FOREIGN PATENT DOCUMENTS

CA 1 155 651 10/1983

(Continued)

OTHER PUBLICATIONS

White, Ron, How Computers Work, Millennium Ed. Que Corporation, Sep. 1999.*

(Continued)

*Primary Examiner*—Andrew J. Fischer
*Assistant Examiner*—Jamie Kucab
(74) *Attorney, Agent, or Firm*—Hanify & King, P.C.

(57) ABSTRACT

The present invention is a method for soliciting orders for customized apparel. The apparel can be appendage apparel, such as footwear, gloves, or head gear, or non-appendage apparel such as jackets. The present method includes providing an order form accessible through at least one computer by one or more users. The present method further includes providing one or more possible design parameters, requesting the user to customize the apparel by entering at least one of the parameters on the order form. The user submits the order form through the computer and receives apparel according to the order form. The parameters may include size, material, model, style, color, material treatment, or personalization.

19 Claims, 10 Drawing Sheets

U.S. PATENT DOCUMENTS

| | | | | |
|---|---|---|---|---|
| 4,807,143 | A | | 2/1989 | Matsuura .................... 364/468 |
| 4,995,514 | A | | 2/1991 | Forschner ................... 206/574 |
| 5,144,899 | A | * | 9/1992 | Allen .......................... 112/103 |
| 5,164,793 | A | * | 11/1992 | Wolfersberger et al. ..... 356/607 |
| 5,206,804 | A | * | 4/1993 | Thies et al. .................... 705/27 |
| 5,282,328 | A | * | 2/1994 | Peterson ....................... 36/154 |
| 5,317,821 | A | * | 6/1994 | Vargo ............................ 36/93 |
| 5,329,701 | A | * | 7/1994 | Schultz et al. ................. 30/316 |
| 5,341,305 | A | | 8/1994 | Clarino et al. .............. 364/470 |
| 5,351,422 | A | * | 10/1994 | Fitzgerald .................... 36/134 |
| 5,367,712 | A | | 11/1994 | Smith et al. ..................... 2/162 |
| 5,367,793 | A | * | 11/1994 | Deacon et al. ................ 36/127 |
| 5,427,577 | A | | 6/1995 | Picchietti et al. ............. 473/59 |
| 5,539,677 | A | | 7/1996 | Smith .......................... 705/26 |
| 5,590,197 | A | * | 12/1996 | Chen et al. ..................... 705/65 |
| 5,644,857 | A | * | 7/1997 | Ouellette et al. ............... 36/15 |
| 5,663,885 | A | | 9/1997 | Stahl ..................... 364/470.05 |
| 5,671,055 | A | * | 9/1997 | Whittlesey et al. .......... 356/602 |
| 5,680,314 | A | | 10/1997 | Patterson et al. ....... 364/470.03 |
| 5,689,446 | A | * | 11/1997 | Sundman et al. ............ 702/167 |
| 5,712,803 | A | * | 1/1998 | Garuet-Lempirou ........ 702/158 |
| 5,740,555 | A | | 4/1998 | Renegar ...................... 2/161.2 |
| 5,757,661 | A | | 5/1998 | Surville ....................... 364/506 |
| 5,758,365 | A | | 6/1998 | Steeley ........................ 2/161.1 |
| D398,749 | S | * | 9/1998 | Santos .......................... D2/962 |
| 5,822,223 | A | * | 10/1998 | Genest ......................... 702/155 |
| 5,825,652 | A | | 10/1998 | LeBlond et al. ......... 364/470.03 |
| D401,748 | S | * | 12/1998 | Santos et al. ................. D2/962 |
| D401,749 | S | * | 12/1998 | Santos et al. ................. D2/962 |
| D401,750 | S | * | 12/1998 | Santos et al. ................. D2/962 |
| D401,751 | S | * | 12/1998 | Santos et al. ................. D2/962 |
| D401,752 | S | * | 12/1998 | Santos et al. ................. D2/962 |
| D402,799 | S | * | 12/1998 | Santos et al. ................. D2/962 |
| D402,800 | S | * | 12/1998 | Santos et al. ................. D2/962 |
| D402,801 | S | * | 12/1998 | Santos et al. ................. D2/962 |
| 5,850,222 | A | | 12/1998 | Cone ........................... 345/418 |
| 5,887,363 | A | * | 3/1999 | Rhodes ......................... 36/127 |
| 5,953,448 | A | | 9/1999 | Liang .......................... 382/154 |
| 5,956,525 | A | | 9/1999 | Minsky .......................... 396/3 |
| 5,974,400 | A | * | 10/1999 | Kagami et al. ................ 705/26 |
| 5,986,671 | A | | 11/1999 | Fredlund et al. ............ 345/435 |
| 6,000,081 | A | | 12/1999 | Sheridan .................... 12/115.6 |
| 6,092,605 | A | * | 7/2000 | Cisneros ....................... 168/11 |
| 6,127,010 | A | * | 10/2000 | Rudy ........................ 428/35.7 |
| 6,289,107 | B1 | | 9/2001 | Borchers et al. ............ 382/100 |
| 6,331,893 | B1 | * | 12/2001 | Brown et al. ................ 356/601 |
| 6,343,276 | B1 | * | 1/2002 | Barnett ......................... 705/28 |
| 6,408,543 | B1 | * | 6/2002 | Erickson et al. ............... 36/100 |
| 6,550,149 | B2 | * | 4/2003 | Dowdell ......................... 33/6 |
| 6,601,042 | B1 | * | 7/2003 | Lyden .......................... 705/26 |
| 6,654,705 | B1 | * | 11/2003 | Benson et al. .............. 702/168 |
| 6,665,577 | B2 | * | 12/2003 | Onyshkevych et al. ...... 700/130 |
| 6,792,401 | B1 | * | 9/2004 | Nigro et al. ..................... 703/6 |
| 6,861,396 | B2 | * | 3/2005 | Baker et al. ................. 510/109 |
| 2001/0020222 | A1 | * | 9/2001 | Lee et al. ..................... 702/155 |
| 2002/0010658 | A1 | * | 1/2002 | Suzuki et al. .................. 705/28 |
| 2002/0013721 | A1 | * | 1/2002 | Dabbiere et al. ............... 705/7 |
| 2002/0020222 | A1 | * | 2/2002 | Schmidt et al. ............... 73/715 |
| 2002/0023087 | A1 | * | 2/2002 | Vickery et al. ................. 707/7 |
| 2002/0120531 | A1 | * | 8/2002 | Fonsen ........................ 705/26 |
| 2002/0157266 | A1 | * | 10/2002 | Dowdell .......................... 33/6 |
| 2002/0158358 | A1 | * | 10/2002 | Franzene ................... 264/40.1 |
| 2003/0110095 | A1 | * | 6/2003 | Danenberg .................. 705/26 |

FOREIGN PATENT DOCUMENTS

| | | |
|---|---|---|
| CA | 2269427 | 10/1999 |
| CA | 2282118 | 3/2000 |
| DE | 36 19 190 A1 | 12/1987 |
| DE | 196 20 144 A1 | 11/1997 |
| DE | 297 16 468 U1 | 1/1998 |
| DE | 196 35 753 A1 | 4/1998 |
| DE | 197 40 492 C1 | 10/1998 |
| DE | 299 19 322 U1 | 3/2000 |
| EP | 0 227 642 | 7/1987 |
| FR | 2 236 436 | 2/1975 |
| FR | 2 490 465 | 3/1982 |
| FR | 2 565 793 | 12/1985 |
| FR | 2 617 684 | 1/1989 |
| FR | 2 696 621 | 4/1994 |
| GB | 2 130 768 A | 6/1984 |
| JP | 8-144116 | 6/1996 |
| JP | 10-174732 | 6/1998 |
| JP | 10-262950 | 10/1998 |
| JP | 11-85838 | 3/1999 |
| JP | 2000-3383 | 1/2000 |
| JP | 2000-37496 | 2/2000 |
| SU | 936874 | 6/1982 |

OTHER PUBLICATIONS

Derfler, Frank J. et. al. How Networks Work, Millennium Ed., Que Corporation, Jan. 2000.*

Gralla, Preston, How the Internet Works, Millenium Ed., Que Corporation, Aug. 1999.*

"Anatomy of a Hersey", Hersey Custom Shoe Company, Apr. 5, 2001.*

Where work meets play. Potentials. Mar. 1, 2000;33(3): 12-19. In: ProQuest Central [database on the Internet] [retrieved Oct. 28, 2008]. Available from: http://www.proquest.com/; Document ID: 51139063.*

* cited by examiner

COMPUTERIZED ARTICLE CUSTOMIZATION SYSTEM AND METHOD FOR USE THEREOF

FIELD OF THE INVENTION

The present invention relates to a computerized article customization system and method for use thereof. More particularly, the present invention relates to a system and method using a computer network for soliciting orders for customized articles including, for example, allowing a user to transmit to the supplier, manufacturer or retailer customized preferences related to cut and assembled articles, such as apparel.

BACKGROUND OF THE INVENTION

Articles that are sewn and secured together, particularly those worn by a user are generally selected based on a number of criteria. When these articles are used in a sport, such as golf, the fit and comfort of the article can be critical to the user's success in the sport. For example, loose fitting golf gloves can hamper a player's ability to properly grip their club. As a result, the player's performance can be poor. In another example, the fit of a golfer's shoes can have consequences not only in the comfort of the player but also in the shoes' ability to provide a solid base of support. If the shoes are too loose in the heel area, a golfer's foot can move relative to the ground which is undesirable. These deficiencies can also result in the player having poor performance.

Many golfers would prefer to have custom apparel made-to-order that matches their individual needs. This is accomplished by custom-making apparel for the golfer. Since the majority of golfers cannot afford custom-made shoes, they must wear shoes of a pre-made size that best fit their feet.

Presently, ordering customized articles, such as golf shoes, requires telephoning or physically going to a supplier, manufacturer or retailer to discuss and order such shoes with the desired characteristics. This process may include having the user's feet measured. Currently, this method of forming customized golf shoes is a time consuming, labor intensive and expensive process.

There is a need for computerized order systems for ordering sports apparel.

SUMMARY OF THE INVENTION

The present invention relates to a method for soliciting or placing at least one order for appendage apparel. The method comprises the steps of providing at least one computer; providing an order form through at least one computer to be accessed by at least one user from a remote site; providing at least one parameter, including a size parameter; providing at least one measuring device connected to the computer for measuring the size of the user's appropriate body part; entering the at least one parameter on the order form; submitting the order form through the at least one computer; and receiving the apparel according to each parameter in the order form.

In one embodiment, the step of providing at least one parameter further includes providing at least one of the following parameters: material, model, style, color, material treatment, or personalization. In another embodiment, the step of providing an order form further includes providing at least one of the following order forms: a headgear order form, a footwear order form, or a glove order form.

In yet another embodiment, the step of providing at least one computer further includes providing a first computer at a store location and a second computer at a warehouse in communication with the first computer. In such an embodiment, the step of providing at least one computer may further include providing a third computer at a manufacturing facility in communication with the first and second computers. One or all of these computers can be connected to the Internet.

In another embodiment, the measuring may be accomplished by a laser-sizing device.

One feature of the present invention is that appendage apparel according to the order form may be provided from existing stock at the remote location. Another feature of the present invention is that appendage apparel according to the order form may be provided from existing stock at a warehouse at a location different from the remote location. According to yet another feature of the present invention, the appendage apparel according to the order form may be manufactured.

The method of the present invention can be used to manufacture footwear, such as golf shoes, and gloves, including golf gloves.

According to another embodiment of the present method, the method may include providing a plurality of parameters, where one of the parameters includes applying selected indicia to the apparel.

The present invention is also directed to a computerized golf apparel order system comprising three computers. The first computer is at a store location, and includes an order form with at least one parameter. The second computer is at a warehouse and is in communication with the first computer. The third computer is at a manufacturing facility and is in communication with the first and second computers. The system further includes a measuring device connected to the first computer.

BRIEF DESCRIPTION OF THE DRAWINGS

To facilitate the understanding of the characteristics of the invention, the following drawings have been provided wherein.

DETAILED DESCRIPTION OF THE PREFERRED EMBODIMENTS

The present invention includes a computerized article customization system and method for use thereof. The method includes soliciting or placing orders for customized articles or apparel using a system 6 with a computer network, as shown in FIG. 1.

Figure 2:
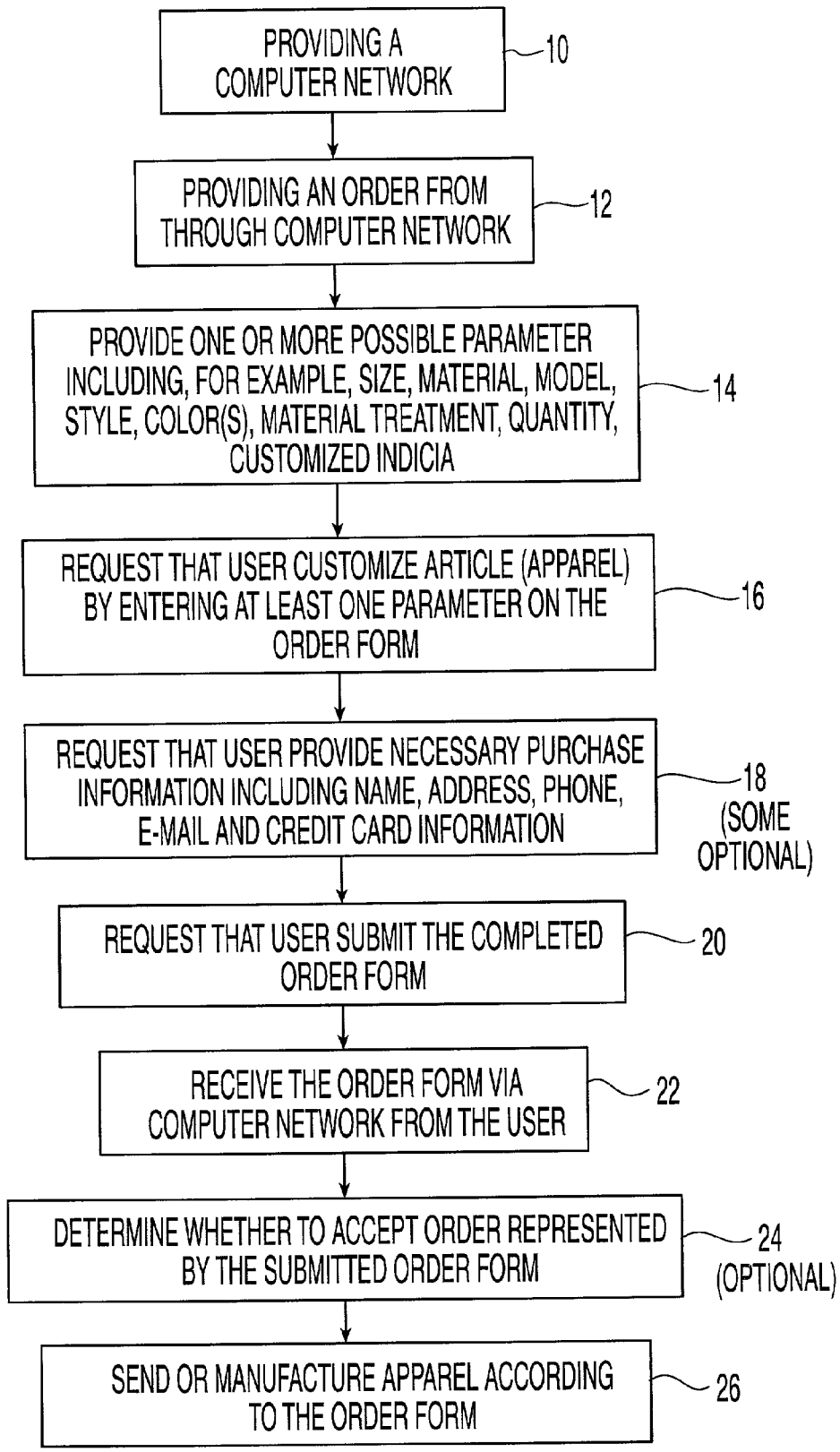
FIG. 2 is a flow chart of the method of the present invention for soliciting orders for customized apparel using a computer network.
Figure 6:
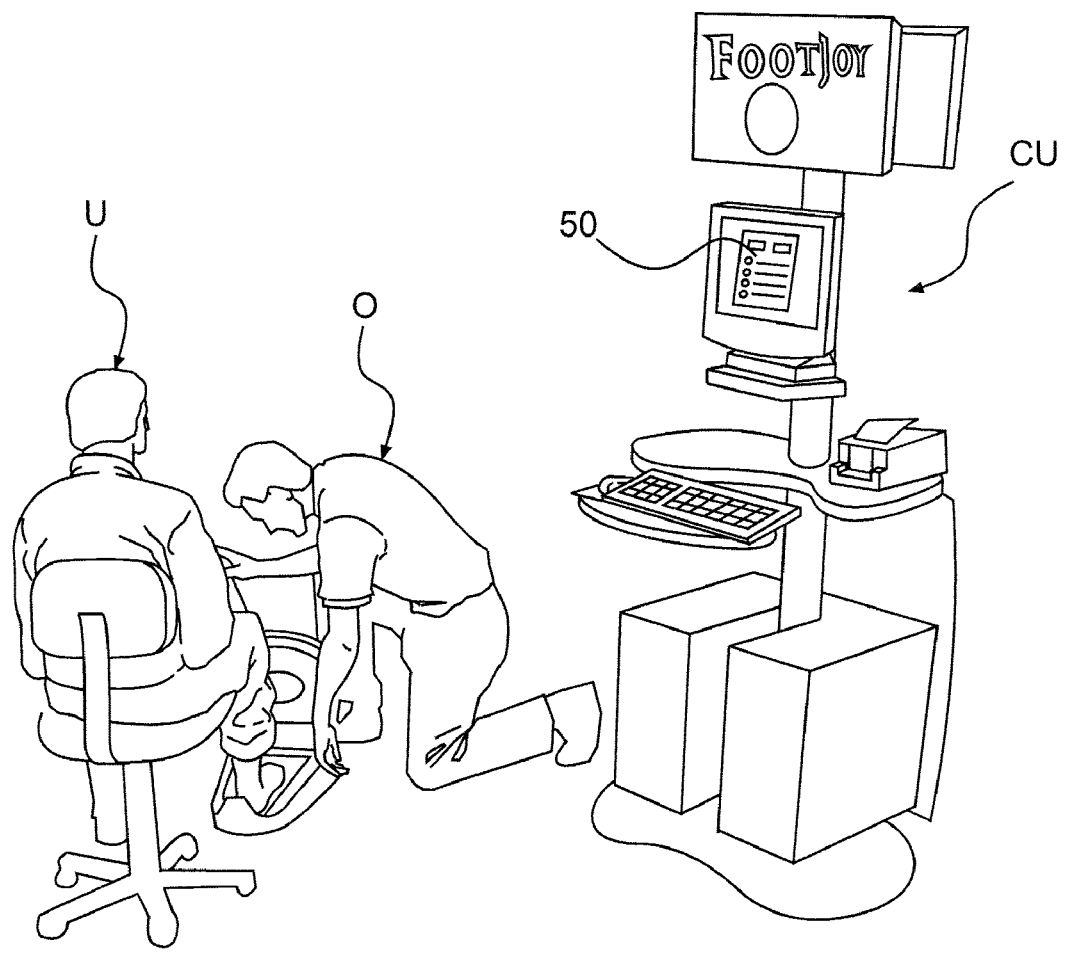
FIG. 6 is a front, perspective view of the measuring device of FIG. 4 during measuring of a user's foot.

A flow chart of the method is shown in FIG. 2. The preferred method generally includes steps 10-26. Step 10 includes providing an order form accessible through at least one computer or a computer network by one or more users U (as shown in FIG. 6) from one or more sites. Steps 12 and 14 include providing an order form through the computer and providing one or more possible design parameters or criteria. The order form relates to an article, such as a golf shoe 15 shown in FIG. 3. Step 16 includes requesting that the user customize the article by entering at least one of the design parameters on the order form. Step 18 is optional and includes the user providing the necessary purchase information. Step 20 includes requesting that the user submit the order form through the computer network. Step 22 includes receiving the order form. The method may also include step 24 of determining whether to accept the order represented by the customized order form. Step 24, however, is optional. Step 26 includes sending a pre-made article according to the customized order form or manufacturing one or more articles according to the customized order form so that a user receives the desired merchandise.

Figure 1:
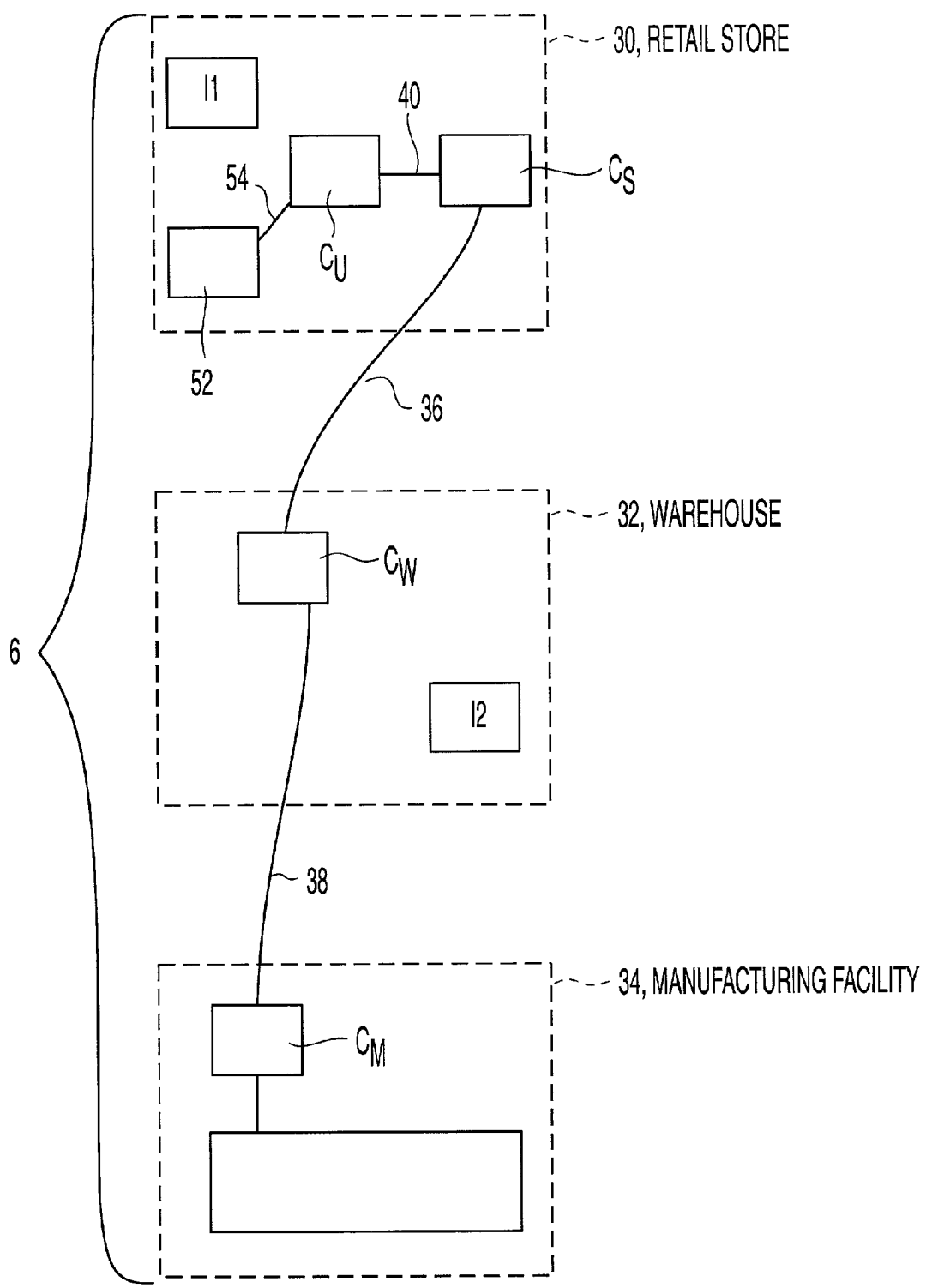
FIG. 1 is a schematic view showing a preferred embodiment of a computer network of the present invention for use with an inventive method.

Referring to FIGS. 1 and 2, step 10 of providing the computer network includes providing a store computer $C_S$ at a retail store 30, a warehouse computer $C_W$ at a warehouse 32 remote from the retail store 30, and a manufacturing computer $C_M$ at a manufacturing site 34 remote from the store 30 and the warehouse 32.

The computers $C_S$, $C_W$, and $C_M$ are electronically connected via cables 36 and 38. Other electrical connection devices or components known by those of ordinary skill in the art can also be used, such as a wireless network, satellite communication network, and the internet.

The computer network further includes a user computer $C_U$ electronically connected to the store computer $C_S$ via a cable 40. In an alternative embodiment, the functions of the user computer $C_U$ and the store computer $C_S$ can be combined into one computer. Furthermore, the store 30 can include a plurality of user computers $C_U$ connected to the store computer $C_S$.

Although in this embodiment, the user computer $C_U$ is located in the store 30, in an alternative embodiment the user computer $C_U$ can be located remote from the store 30 such as in the user's home or office. This remote user computer $C_U$ can be connected to the store computer $C_S$ and/or the warehouse computer $C_W$ by the Internet or other devices known by those of ordinary skill in the art.

Figure 4:
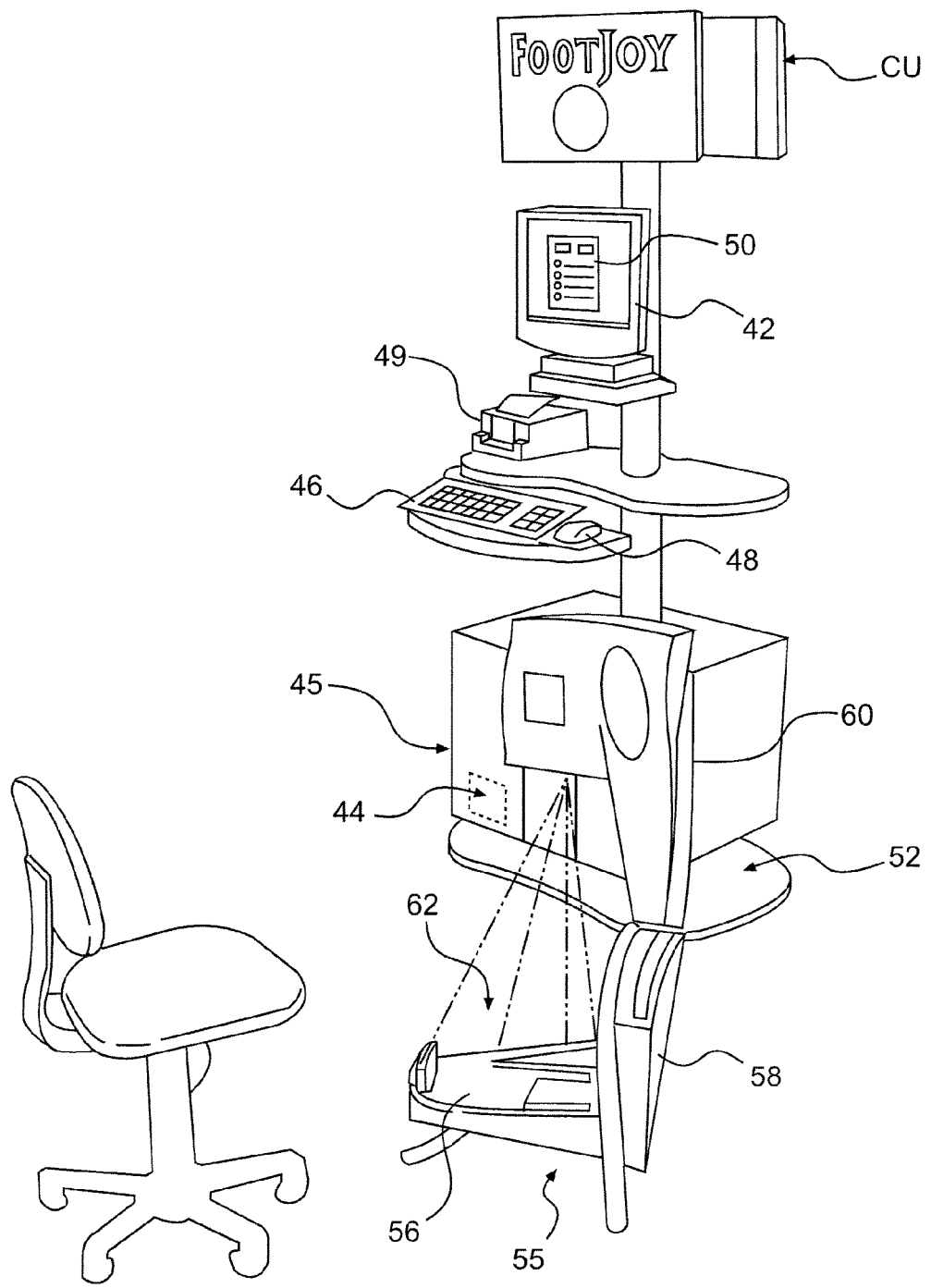
FIG. 4 is a side, perspective view of a measuring device for use in the inventive method.

As shown in FIGS. 2 and 4, in one embodiment the user computer $C_U$ includes a monitor 42, a microprocessor 44 (shown in phantom) within a housing 45, a keyboard 46, a mouse 48, and a printer 49. In other embodiments, the user computer $C_U$ can be a dumb terminal, internet appliance, personal digital assistant, handheld computer, cellular phone, or virtually any other electronic network appliance that can electronically connect with the store computer $C_S$.

The monitor 42 displays a graphical user interface in the form of an order form 50. The microprocessor 44 may stores and run various software programs to allow the user computer $C_U$ to operate as necessary. The keyboard 46 and mouse 48 are data input devices that the user operates to enter data into the order form 50. The printer 49 is a data output device that the user operates to export data from the computer, such as printing a copy of the order form 50 for record keeping purposes. The various components 42-49 of the user computer $C_U$ are connected in a conventional manner. The user computer $C_U$ and the store, warehouse, and manufacturing computers $C_S$, $C_W$, $C_M$, are commercially available.

Figure 5:
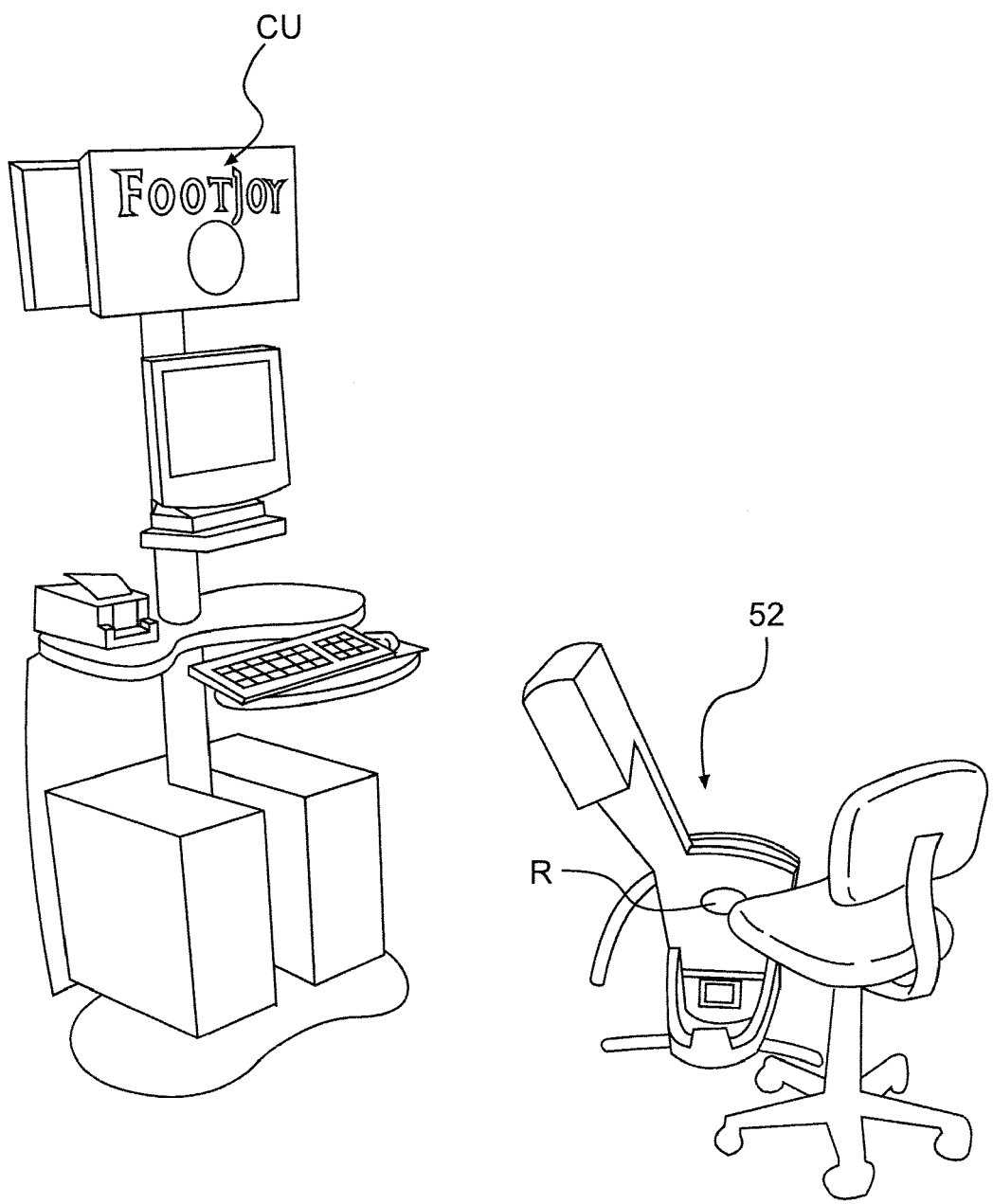
FIG. 5 is a front, perspective view of the measuring device of FIG. 4.

Referring to FIGS. 1 and 4, the system 6 further includes a measuring device 52 connected to the user computer $C_U$ via cable 54. In the embodiment shown in FIG. 4, the measuring device 52 includes a base 55 with a slightly inclined platform 56 and a vertical member 58 connected thereto. The measuring device 52 further includes a scanner housing 60 movably mounted to the vertical member 58. As shown in FIG. 5, the scanner housing 60 moves rotatably about rotation axis, designated R. The movement of the scanner housing 60 can be powered by a motor or be done manually by an operator O (shown in FIG. 6). The scanner housing 60 supports a scanner (not shown) for emitting a laser light 62 (as shown in FIG. 4) for imaging a user's foot.

The preferred scanner used is commercially available and one recommended scanner for use in this system is the RealScan USB manufactured by 3D Digital Corp. of Danbury, Conn., or other three dimensional scanning systems such as those manufactured by Sanyo Electric Co., Ltd. of Japan. RealScan USB enables users to capture complex geometric data of an object to create a three-dimensional digital model. The resulting digital model is easily imported into software to measure various dimensions of a user's foot.

The scanner is shown in use in FIG. 6, in this illustration the user U is having their feet scanned and the operator O is running the measurement device 52 and entering the data in the order form 50.

Alternatively, the measuring device can measure a wearer's stretched shoe to determine the user's foot dimensions or the measuring device can use photographs, probes or the like to make measurements. Also, the measuring device can be a simple device, such as a tape measure and/or ruler or a hand measuring device as disclosed in U.S. application Ser. No. 09/494,646 to Bonzagni et al., entitled "Glove Fitting Device and Method" which is incorporated by reference herein in its entirety. Any device useful to measure the necessary appendage (i.e., head, foot, or hand) can be used.

In another embodiment of the system, the measuring device may not be used. In such a system, a user when prompted by the order form 50 can input predetermined measurements using the keyboard 46 and/or mouse 48 (as shown in FIG. 4). The user can also enter the measurements by entering a customer number that allows the user to access the user's measurements from the computer's memory. In addition, the user computer $C_U$ can include a card reader or disk drive (not shown) that can retrieve data from a storage device, such as a chip, card, disk or the like. The storage device would have the necessary measurement data thereon.

Referring to FIGS. 1 and 2, the step 12 of providing an order form accessible through the computer network by one or more users from one or more sites may be accomplished by including such the order form 50 on the user computer $C_U$ as discussed above or on the manufacturer's, supplier's or retailer's website on the Internet. Alternatively, the order form may be sent to users via e-mail or sent to the user in a paper version by mail or facsimile. This paper version of the form is filled out by the user and returned to the retailer or manufacturer for entry of the data into the order form on the computer.

In accordance with the present method, the manufacturer, supplier or retailer may carry out the step 14 of providing to the user one or more possible design parameters or criteria which may be used to customize the article. As explained below, these parameters generally define the characteristics of a type of article or articles in general. The design parameters which generally apply to all types of articles may include the quantity and type of articles. The articles contemplated for the present invention are those that are made of material that is cut and secured together to form a product. The securement can be by bonding with adhesive, stitched or the like. These articles include clothing or garments like gloves, coats, shirts, pants, jackets and the like. This articles also include headgear, such as hats and footwear like golf shoes. In addition, can include sporting goods, such as base ball gloves, home furnishings, vehicle components, such as seats, and bags. Thus, appendage apparel such as hats, gloves and shoes are contemplated.

Figure 3:
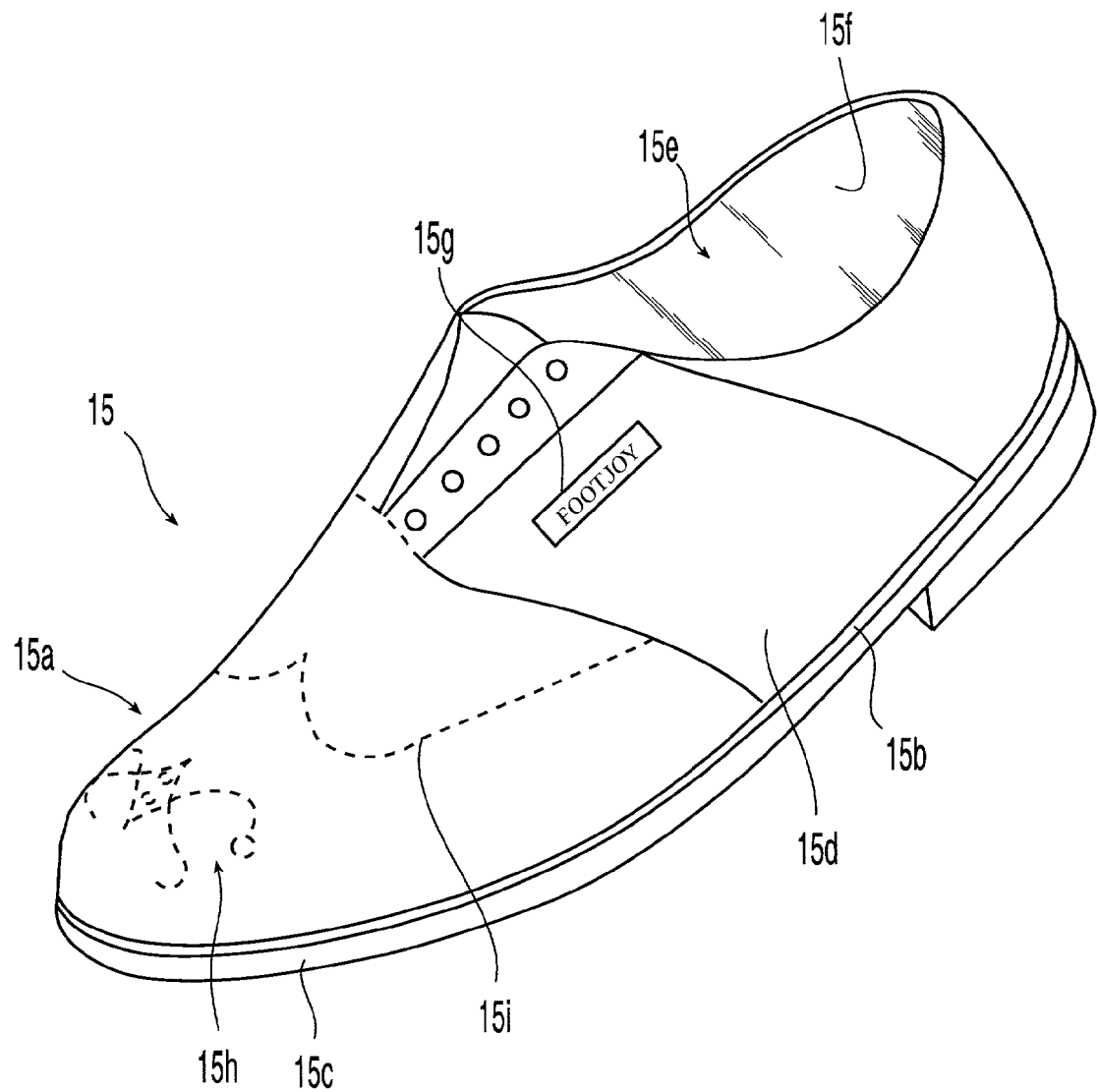
FIG. 3 is a perspective view of a shoe that can be ordered using the inventive method.

FIG. 3 illustrates one embodiment of a golf shoe 15 that can be formed according to the present invention. The shoe 15 includes an upper 15a, a midsole 15b, and an outsole 15c. The upper 15a is conventional and optionally includes a piece of saddle material 15d between the front and rear of the shoe. The upper 15a is joined to the midsole 15b using cement or the like and conventional techniques. Once joined thereto the upper 15a defines an opening 15e for receiving a wearer's foot. The upper further includes an inner layer 15f or lining, a logo 15g and a plurality of patterns. The first pattern 15h is formed of holes in the upper material. The second pattern 15i is formed of stitching. The shoe can also include an insole (not shown).

Referring again to FIG. 2, the user at step 16 is then asked to customize the desired article by entering at least one design parameter on the order form to be applied to the customized article. The user may enter the desired design parameters by either typing in the desired values for each parameter on the keyboard 46 (as shown in FIG. 4) with or without the mouse 48, or by selecting one value from a choice of values. This choice of values can be displayed on lists, pull-down menus, catalog pages or by images on the monitor 42.

In the preferred embodiment, the user may choose the particular type of article that he or she desires to customize. For example, the user may choose to customize shoes, golf shoes, soccer shoes, football shoes, bowling shoes, dance shoes, basketball shoes, baseball shoes, softball shoes, tennis shoes, or other types of shoes. The user may then further customize the shoes by entering additional desired design parameters, including design parameters specific to the chosen shoes. For example, a user may select golf shoe 15 (as shown in FIG. 3) as the desired type of shoe to customize. Because there are certain design parameters that apply specifically to golf shoes but not to other types of shoes, the present method may include providing a specific set of design parameters corresponding to golf shoes and a set of design parameters corresponding to various types of sports shoes. The set of golf shoe design criteria may include, but is not limited to: size, upper and sole material, material treatment, model, color(s), traction level, cleat type, cushioning and personalization. Each of these design parameters will be discussed below.

One advantage of the present invention is that a user can select any value within a range of acceptable values for certain design parameters. For example, size may be such a customizable design parameter. Golf shoes are generally sold with lengths between about 8 inches and about 15 inches and widths between A and EEE. However, the present invention may allow a user to specify any length and width values from within a given range of acceptable values, as well as different sizes for right and left feet. The acceptable values will generally be determined based on acceptable manufacturing criteria or limitations.

Referring to FIG. 3, for the upper and sole material 15a-c of a golf shoes, the possible choices may include, for example, upper outer-layer material, upper inner-layer material 15f, upper intermediate layer material (not shown), insole material, midsole 15b material and outsole 15c material. Various upper outer and inner layer materials include various types of leather, synthetic leather, woven and non-woven fabrics and the like. Various intermediate-layer materials include temperature responsive membranes, and waterproof membranes. The insole material can be selected from for example, foam, foam with comfort enhancement, such as with temperature control or a level of breathability. The midsole materials can be selected from for example, ethylene vinyl acetate copolymer (EVA), PU, rubbers, or combinations thereof. The outsole materials can be selected from for example, leather, synthetic leather, thermoplastics, plastics, or combinations thereof.

For the material treatment, the possible choices may include, for example, temperature responsive treatment as disclosed in U.S. Pat. No. 6,179,879, entitled "Leather Impregnated With Temperature Stabilizing Material and Method For Producing Such Leather," stain-proofing, pattern and/or waterproofing.

The pattern on the upper can be provided by the choice of leather for example lizard, crocodile, and snake. Patterns that can be applied or formed on the materials include stitching, holes, pebble grain, circle or other shaped print, tumbled, cross-hatch, weave, emblems, or no pattern could be specified so that the leather is smooth. As shown in FIG. 3, patterns 15h and 15i are examples of those that can be used. The choice of pattern and material may require the user to specify the location of these materials or patterns on the shoe, such as in the toe, saddle 15d (see FIG. 3), or heel areas.

The possible choices for the model of the customized golf shoes may include, for example, if the manufacture is Acushnet the shoes in their line, representative of which are the FootJoy Classics Dry® Premiere, Classics®, DryJoys®, or SoftJoys®. Once the model is selected, materials and treatment choices consistent with those offered with each model may be limited.

The possible choices for color(s) can include any available to the manufacture and the user may need to specify to which portion of the shoe the color should be applied. Examples of available colors are white, black, brown, tan, burgundy, red, blue, and cream. Various shades of these colors are also possible choices.

The traction level choices can include the type of outsole configuration, i.e., the types, location, and configuration of ridges, grooves and projections on the outsole. The cleat type choices include whether to have cleats, and if cleats are desired the cleat material (i.e., metal or plastic), the cleat configuration (or projection shape and location), and the cleat projection length. The cleat choices can also include whether elements, such as traction rings or annular members with traction projections thereon that are secured by the cleats are to be used and if so, the pattern and configuration of the traction rings.

The choices in the amount and type of cushioning include rubber plugs, air plugs, gel cushions, foam or the like and their hardness and location.

One important advantage of the present method is the ability for a user to quickly and easily order personalized shoes with custom indicia or logos. One method of applying custom indicia to golf shoes is to punch patterns into the outer layer material. Custom logos in the form of embroidered, printed or inscribed tabs that are attached to the outer layer material can also be used. Or the logos may be applied directly to the outer layer material.

Referring again to FIG. 2, the present method may include the step 18 of requesting various information from the user to complete the current order. This information can include, but is not limited to, his or her name, address, place of business, work and home phone number(s), fax number, e-mail address, how to ship, credit card number, and credit card expiration date, or other form of payment information, such as smart card information, Paypal, or other electronic payment methods. In some circumstances, a user may be asked to provide a predetermined identification number. This identification number can correspond to a catalog or customer number. In an embodiment where a pro shop or retailer is placing the order with a manufacturer, step 18 may also include requesting a predetermined identification number corresponding to that pro shop or retailer.

Once all of the relevant and/or necessary information has been provided by the user on the order form, the user is asked to submit the completed order form to the manufacturer, retailer or supplier over the computer network, thus placing the order (step 20). In a preferred embodiment, the user may be given alternative options before submitting the completed form. For example, the user may be able to clear the form and start over, revise the form, save the form in a database for a predetermined amount of time before actually placing the order, or cancel the order altogether.

Once the order form is submitted by the user, the present method includes step 22 of receiving the order form via the computer network from the user. Referring to FIG. 1, the order form is received by the store computer $C_S$ from the user computer $C_U$. Alternatively, the order form can be submitted to the warehouse and/or manufacturing computers $C_W$ and $C_M$.

Once the order form is submitted by the user, the present method includes step 24 of determining whether or not to accept the order. This step is optional and prevents the manufacturer, supplier or retailer from attempting to fill an impracticable or impossible order, or from filling an order for a user who has provided a false, invalid or canceled credit card.

After the particular computer receives the completed order form and decides to accept the order, the order may be filled (step 26). Step 26 preferably further includes the step of the store computer $C_S$ (see FIG. 1) determining if the shoes represented by the customized order form are in the store inventory. If these shoes are in the store inventory, this information is used to retrieve the shoes and provide them to the user in the store. If these shoes are not in the store inventory, step 26 may further include the step of the order form being submitted to and received by the warehouse computer $C_W$ from the store computer $C_S$.

The warehouse computer $C_W$ determines if the shoes represented by the customized order form are in the warehouse inventory. If these shoes are in the warehouse inventory, this information is used to retrieve the shoes and send them to the user either by delivering them to the store or delivering them to another location, such as the user's home. If these shoes are not in the warehouse inventory, step 26 may further include the step of the order form being submitted to and received by the manufacturing computer $C_M$ from the warehouse computer $C_W$. In other embodiments, customization can be done in the warehouse, such as by attaching a custom logo or custom ball mark on gloves, or custom tassles, medallions, or ball mark on shoes.

The manufacturing computer $C_M$ determines if the shoes represented by the customized order form are scheduled to be manufactured as part of the standard process. If so, the customer may be sent an estimated time of delivery. If not, the data from the customized order form is used to manufacture the shoes according to the order form in a custom run. The manufacturing computer $C_M$ may send the user an estimated delivery time, and the ordered shoes are delivered to the customer.

Thus, the manufacturing process may be integrated as part of the overall customization process. This integration may be accomplished by, for example, translating the design parameter data into manufacturing control data to be used directly by the machinery at a manufacturing facility. The manufacturing facilities, which operate to create the customized shoes, generally comprise different machines operated in a series for making the shoes. For example, there may be an outsole-molding apparatus which can mold a sole with the type of material selected by the user on the order form.

Figure 7:
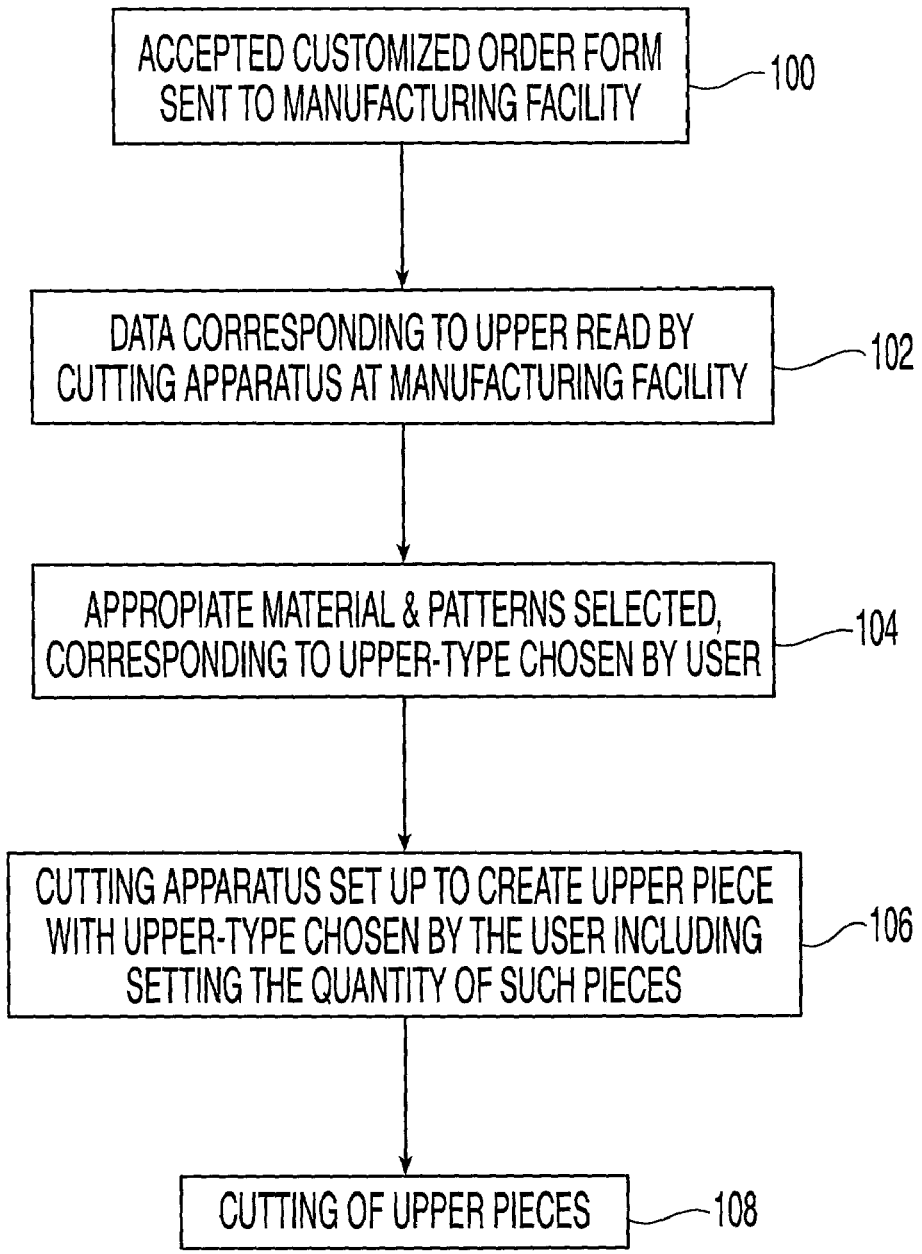
FIG. 7 is a flow chart of a method of integrating a manufacturing process in the inventive method.

FIG. 7 illustrates an integrated manufacturing process for customizing the upper on the shoe. These steps are sub-steps of step 26, shown in FIG. 2. In step 100, the order form is received by the manufacturing computer $C_M$ (shown in FIG. 1) in the manufacturing facility. The present invention may include step 102 of reading the specific data or information corresponding to the upper-type chosen by the user. Generally, this specific data would be read by the cutting-apparatus, so the operator and/or apparatus may then carry out the step 104 of selecting the appropriate material and cutting patterns for the shoe corresponding to the upper type chosen by the user.

The next step 106 may include setting up the cutting-molding apparatus with appropriate values to prepare the machine to cut the upper material for the custom shoe. For example, once the appropriate pattern is selected according to the form, the cutting apparatus or operator should put the corresponding pattern into place for cutting. Further, the apparatus should be set up to make the proper number of upper pieces.

Finally, the present method may include the step 108 of activating or running the cutting-molding apparatus to physically cut the upper material as desired by the user.

These and other aspects of the present invention may be more fully understood with reference to the following non-limiting example, which is merely illustrative of an article that can be formed using the present inventive system and method, and is not to be construed as limiting the invention, the scope of which is defined by the appended claims.

Figure 8:
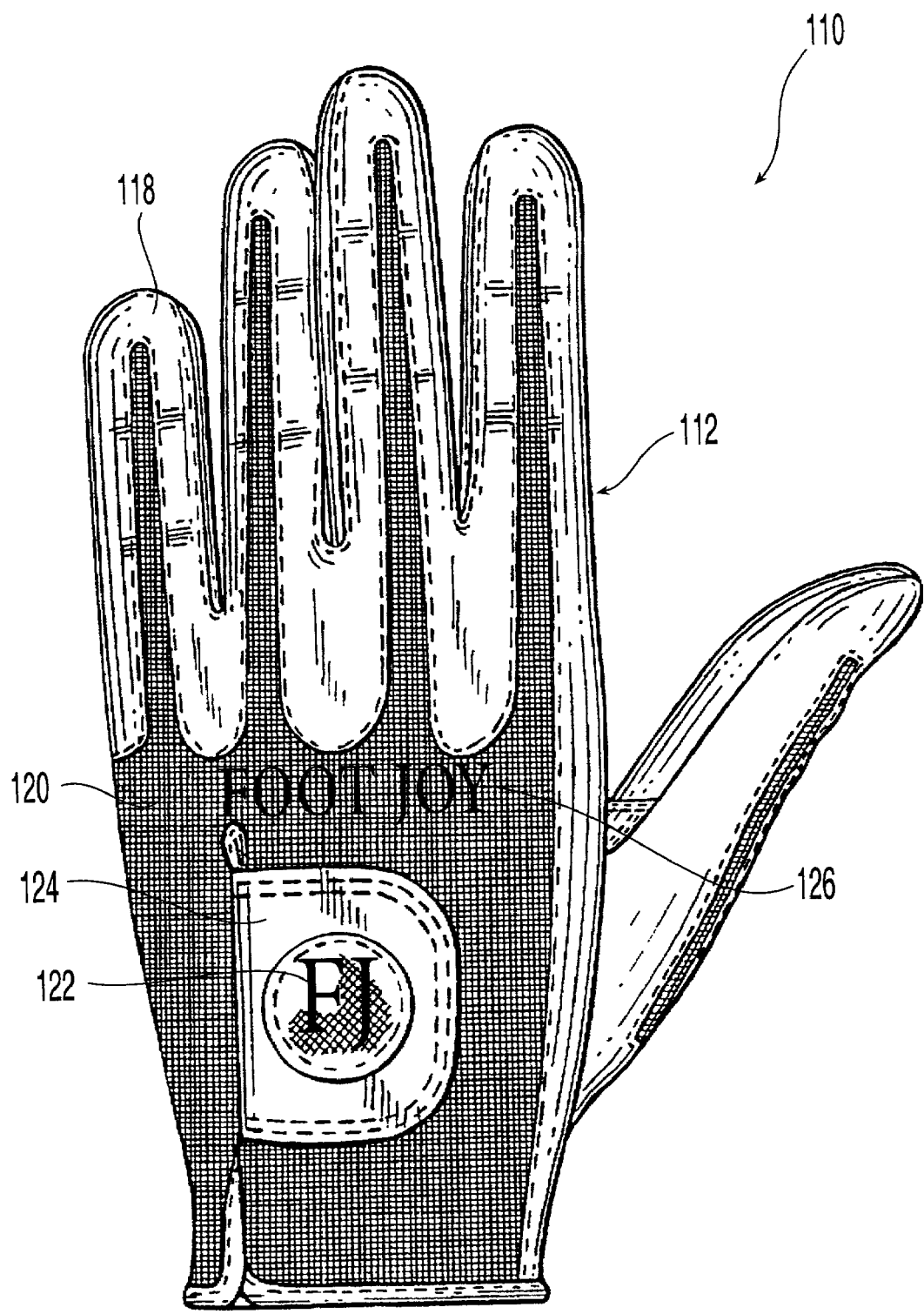
FIG. 8 is a back view of a glove that can be ordered using the inventive method.
Figure 9:
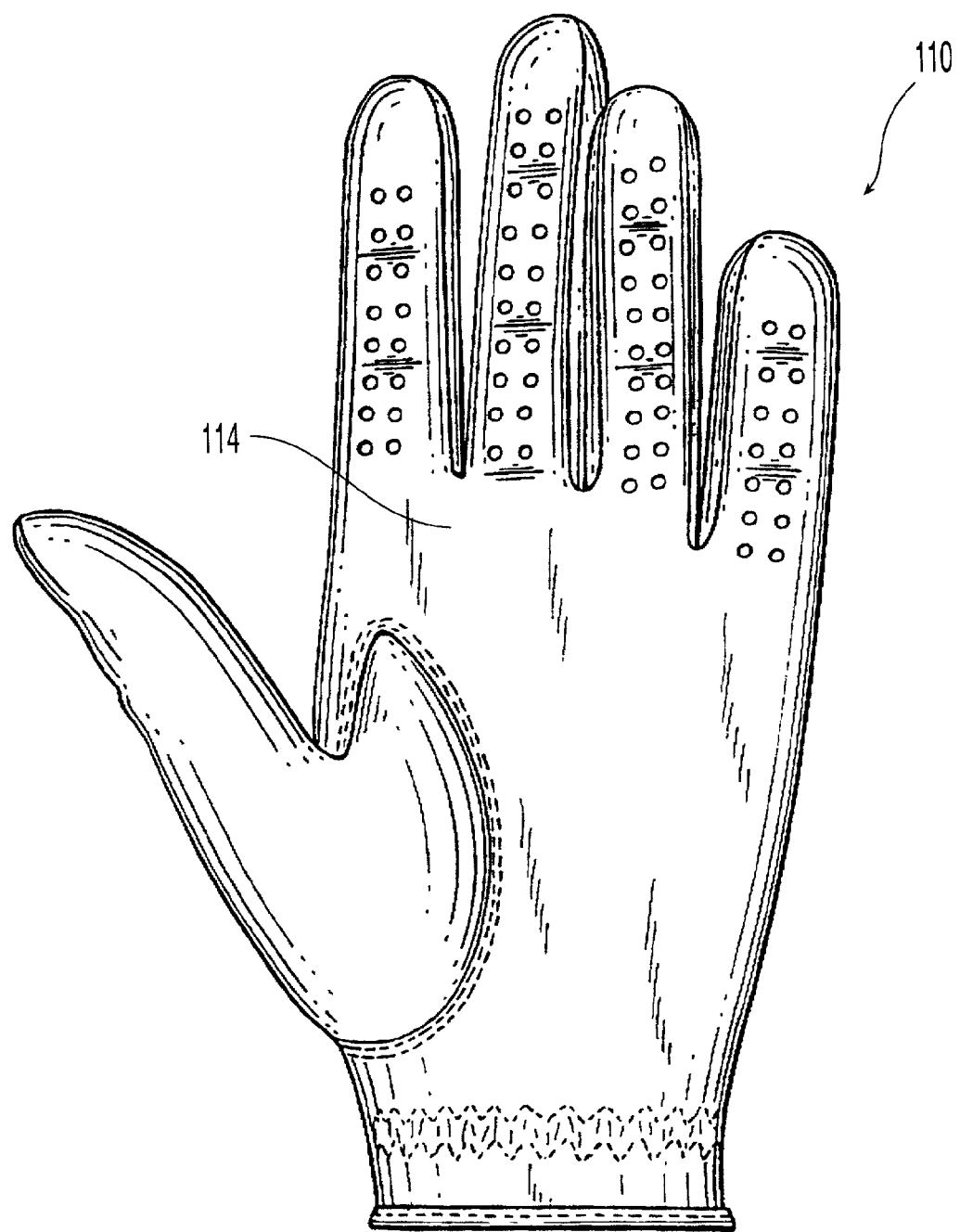
FIG. 9 is a front view of the glove of FIG. 8.

As shown in FIG. 8, the user choose a golf glove 110 as the particular type of article that he or she desires to customize. The present method for customizing the golf glove is the same as that disclosed with reference to FIG. 2 above. The design parameters, however, may include, but is not limited to: size, rear panel 112 material, front panel 114 (as shown in FIG. 9) material, fourchette 116 (as shown FIG. 10) material, material treatments, model, color(s), and personalization. Some of these design parameters will be discussed below.

Figure 10:
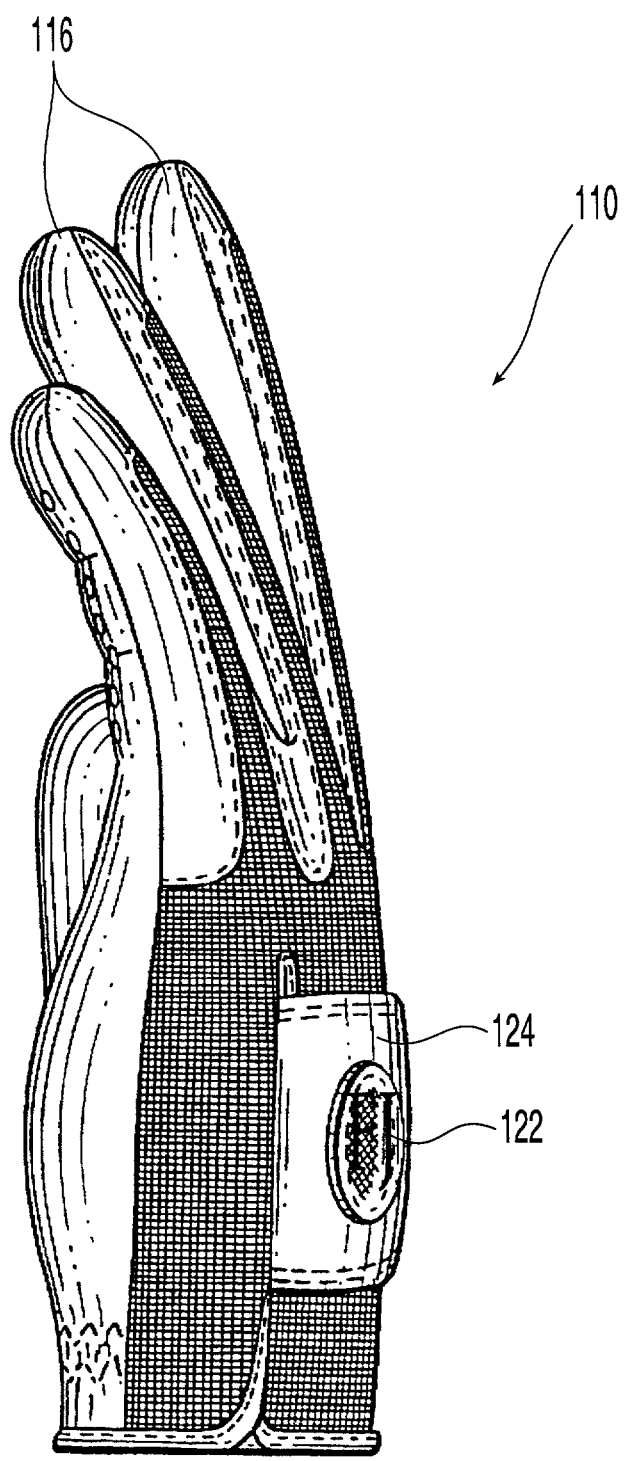
FIG. 10 is a side view of the glove of FIG. 8.

Referring to FIGS. 8-10, in the present method, the user selects the model as shown in FIG. 8. In this method, the rear panel 112 material was selected to include an synthetic back portion 118 and a lycra, elastic back portion 120. The back portion 118 is chosen to be grey. The back portion 118 is chosen to be black. The front panel 114 was selected to be grey leather, the fourchettes 116 of the fingers and thumb of the glove were selected to be of a grey leather. In an alternative embodiment, one or all of the fourchettes can be elastic material of various colors or leather of various colors. The user may select material treatments for the glove.

The user may also select personalization. In this example, as shown in FIGS. 8 and 10, the personalization selected consists of an embroidered FJ logo 122 attached to the closure tab 124. The personalization also includes a FootJoy indicia 126 embroidered on the back portion 120 of the glove.

As discussed above, the user fills out and submits an order form for the glove 110 and the glove is given to the user at the retail store, shipped from the warehouse or manufactured custom and sent.

The present method of ordering custom articles is more efficient, even for relatively small orders, because the order may be accessed by the manufacturing facility itself. Further, the present method of customizing articles is more flexible than prior customization methods in that there may be more choices available to the user. In addition, the present invention allows for a consumer to order custom articles from a computer terminal in a golf pro shop after the consumer has received the advice of the golf professional on what type of golf shoe will suit the consumer's game. This advice may be coupled with a testing facility in the golf pro shop.

While it is apparent that the illustrative embodiments of the invention disclosed herein fulfill the functions stated above, it will be appreciated that alternatives, modifications, and equivalents and other embodiments may be devised by those skilled in the art. Therefore, it will be understood that the appended claims are intended to cover all such modifications and embodiments which would come within the spirit and scope of the present invention.

What is claimed is:

1. A method for soliciting or placing at least one order for golf shoes, comprising the steps of:
   providing a computer network comprising
      a first computer at a store location;
      a second computer at a warehouse, wherein the warehouse is remote from the store location
      a third computer at a manufacturing facility, wherein the first, second and third computers are in communication through the computer network, and wherein the manufacturing facility is remote from the store location and warehouse;
   measuring the size of the user's foot to provide a size parameter using a device connected to the first computer;
   providing a first parameter, wherein the first parameter is at least one of cleat type and personalization;
   providing a second parameter, wherein the second parameter is at least one of traction level and cushioning;
   providing a third parameter, wherein the third parameter is at least one of an insole material and an outsole material;
   providing a fourth parameter, wherein the fourth parameter is at least one material treatment;
   entering the first, second, third, and fourth parameters on an order form;
   submitting the order form through the first computer;
   translating the size, first, second, third, and fourth parameters on the order form into manufacturing control data, wherein the manufacturing control data is used to determine whether customized golf shoes represented by the manufacturing control data are in store inventory or warehouse inventory through the computer network, and manufacturing the customized golf shoes according to the manufacturing control data if no customized golf shoes are found in the store or warehouse inventory; and
   receiving the golf shoes according to each parameter in the order form.

2. The method according to claim 1, wherein the step of measuring the size further comprises providing at least one of a laser-sizing device, a photographic-sizing device, or a graduated-sizing device.

3. The method of claim 1, wherein the step of selecting a second parameter further comprises the step of:
   selecting a cushioning type, wherein the choices of cushioning comprise rubber plugs, air plugs, gel cushions, foam, or mixtures thereof; and
   inputting the cushioning type on the order form.

4. The method of claim 1, wherein the step of selecting a first parameter further comprises the steps of:
   providing a custom indicia;
   choosing the custom indicia application method from the group consisting of punching, embroidering, printing, and inscribing; and
   inputting the custom indicia application method on the order form.

5. The method of claim 1, wherein the material treatment is selected from the group consisting of a temperature responsive treatment, stain-proofing, and water-proofing.

6. The method of claim 1, wherein the step of providing a second parameter comprises:
   selecting a traction level from the group consisting of ridges, grooves, and projections; and
   inputting the traction level on the order form.

7. A method for soliciting or placing at least one order for golf shoes, comprising the steps of:
   providing a computer network comprising a first computer at a store location, a second computer at a warehouse remote from the store location, and a third computer at a manufacturing facility remote from the store location and the warehouse;
   providing an order form through the first computer;
   providing at least one measuring device connected to the first computer for measuring a size parameter;
   inputting the size parameter on the order form;
   entering a cleat type on the order form;
   entering an insole material and an outsole material on the order form;
   entering at least one cushioning parameter selected from the group consisting of amount, type, hardness, and location;
   entering a material treatment on the order form;
   submitting the order form through the first computer;
   translating the order form into manufacturing control data representative of each parameter on the order form;
   searching store inventory for golf shoes consisting of the manufacturing control data and using feedback to
      retrieve and deliver the golf shoes if found in store inventory,
      search warehouse inventory for golf shoes represented by the manufacturing control data and retrieve and deliver the golf shoes if found in warehouse inventory, or
      manufacture the golf shoes according to the manufacturing control data and delivering the golf shoes.

8. The method of claim 7, wherein the step of providing at least one measuring device further comprises providing at least one of a laser-sizing device, a photographic-sizing device, or a graduated-sizing device.

9. The method of claim 7, wherein the computer network further comprises at least one user computer connected to the store computer.

10. The method of claim 7, wherein the step of entering at least one cushioning parameter further comprises the steps of:
    selecting a cushioning type, wherein the choices of cushioning comprise rubber plugs, air plugs, gel cushions, foam, or mixtures thereof; and
    inputting the cushioning type on the order form.

11. The method of claim 7, further comprising the steps of:
    providing a custom indicia;
    choosing the custom indicia application method from the group consisting of punching, embroidering, printing, and inscribing; and
    inputting the custom indicia application method on the order form.

12. The method of claim 7, wherein the cleat type comprises metal or plastic.

13. The method of claim 7, further comprising:
selecting a traction level from the group consisting of ridges, grooves, and projections; and
inputting the traction level on the order form.

14. A method for soliciting or placing an order for golf shoes, comprising the steps of:
providing a computer network comprising:
a first computer at a store location;
a second computer at a warehouse remote from the store location;
a third computer at a manufacturing facility remote from the store location and warehouse;
providing an order form through the first computer;
measuring the user's foot size to provide a size parameter using a device connected to the first computer;
providing a custom indicia through the first computer;
entering a plurality of parameters on the order form comprising an insole material, an outsole material, at least one cushioning parameter selected from the group consisting of amount, type, hardness, and location, a material treatment, a cleat type, and a traction level on the order form;
submitting the order form through the first computer;
translating the plurality of parameters on the order form, the size parameter, and the custom indicia into manufacturing control data, wherein the manufacturing control data is used to search store and warehouse inventory for golf shoes represented by the manufacturing control data or manufacturing the golf shoes according to the manufacturing control data; and
receiving the golf shoes represented by the manufacturing control data.

15. The method of claim 14, wherein the step of providing a custom indicia further comprises the steps of:
selecting a custom indicia application method; and
inputting the custom indicia application method on the order form.

16. The method of claim 15, wherein the custom indicia application method is selected from the group consisting of punching, embroidering, printing, and inscribing.

17. The method of claim 14, wherein the step of entering a plurality of parameters further comprises the steps of:
selecting a cushioning type, wherein the choices of cushioning comprise rubber plugs, air plugs, gel cushions, foam, or mixtures thereof; and
inputting the cushioning type on the order form.

18. The method of claim 14, wherein the step of entering a plurality of parameters further comprises the step of:
selecting a material treatment from the group consisting of a temperature responsive treatment, stain-proofing, pattern, and water-proofing.

19. The method of claim 14, wherein the step of entering a plurality of parameters further comprises the steps of:
selecting a traction level from the group consisting of ridges, grooves, and projections; and
inputting the traction level on the order form.

* * * * *